(12) United States Patent
Valentine

(10) Patent No.: US 9,912,253 B2
(45) Date of Patent: Mar. 6, 2018

(54) FULL BRIDGE TUNNEL DIODE INVERTER

(71) Applicant: Motorola Mobility LLC, Chicago, IL (US)

(72) Inventor: Mark F Valentine, Kenosha, WI (US)

(73) Assignee: Motorola Mobility LLC, Chicago, IL (US)

( * ) Notice: Subject to any disclaimer, the term of this patent is extended or adjusted under 35 U.S.C. 154(b) by 145 days.

(21) Appl. No.: 14/957,679

(22) Filed: Dec. 3, 2015

(65) Prior Publication Data

US 2017/0163173 A1 Jun. 8, 2017

(51) Int. Cl.
*H02M 7/5387* (2007.01)

(52) U.S. Cl.
CPC .................................. *H02M 7/5387* (2013.01)

(58) Field of Classification Search
CPC ........ H01F 27/40; H01F 38/42; H02M 7/068; H02M 7/10; H02M 7/06
See application file for complete search history.

(56) References Cited

U.S. PATENT DOCUMENTS

| 3,309,601 A | 3/1967 | Dudley |
| 3,310,725 A * | 3/1967 | Scarr .................. H02M 3/08 327/570 |
| 4,347,558 A * | 8/1982 | Kalinsky ............. H02M 3/3376 363/17 |
| 6,292,118 B1 | 9/2001 | Broekaert |
| 2011/0007546 A1 | 1/2011 | Amin et al. |

OTHER PUBLICATIONS

Search Report for related European Application No. EP16201243.9; report dated Apr. 18, 2017.
Broekaert T P E: "Ultrahigh speed resonant tunneling diode/transmission line clock generator and track-and-hold", High Speed Semiconductor Devices and Circuits, 1997. Proceediings., 1997 IEEE/Cornell Conference on Advanced Concepts in Ithaca, NY, USA Aug. 4-6, 1997, New York, NY, USA, IEEE, US, Aug. 4, 1997, pp. 132-138.

* cited by examiner

*Primary Examiner* — Nguyen Tran
*Assistant Examiner* — Monica Mata
(74) *Attorney, Agent, or Firm* — Miller, Matthias & Hull LLP

(57) ABSTRACT

Systems and methods for electrical power conversion include the provision of a full-bridge tunnel diode inverter topology which provides a balanced push-pull drive voltage and current across the entire transformer primary. Moreover, the full-bridge tunnel diode inverter may avoid operating its tunnel diodes in a high-current/high-voltage state at light loads, unlike a single-diode inverter. The disclosed principles also allow a full-bridge tunnel diode inverter topology that may avoid RF chirps in the tunnel diodes during rising or falling device ramp currents since the primary current passes through two tunnel diodes in series.

19 Claims, 7 Drawing Sheets ously noted in the claims. Additionally, the dis-
FULL BRIDGE TUNNEL DIODE INVERTER

TECHNICAL FIELD

The present disclosure is related generally to inverter circuits, and, more particularly, to an inverter circuit using a tunnel diode.

BACKGROUND

Electrical power transmission technologies are important in a system having centralized electrical power generation or access coupled with distributed electrical power usage. During transmission, it is efficient to transfer electrical power in AC form rather than DC form. Although there are a number of reasons for this, one primary reason is that AC power is easily stepped up to a higher voltage, stepped down to a lower voltage, or even transformed into DC power. In the first two uses, the AC power is input to a transformer having multiple windings, the ratios of which determine the characteristics of the output power.

In the third case, converting AC power to DC power, a full bridge circuit containing diodes is used to rectify the lower portion of the AC curve, such that the AC power is converted to a positive voltage form varying between zero and the maximum positive value of the AC power input. Other circuit elements such as capacitors serve to smooth the power so that it exhibits a substantially constant positive voltage. This type of circuit may be used, for example, to render usable DC voltage from an AC source such as a wall outlet.

Because AC is such a convenient and prevalent power source, nearly all electrical household appliances are designed for compatibility with AC. This presents a problem for any power source that produces DC electricity—such as a solar panel constructed from photovoltaic cells—because in most cases DC will fail to operate, and even damage, electrical appliances designed to receive AC power.

The present disclosure is directed to a system that can eliminate certain shortcomings of present systems. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this Background section as admitted or assumed prior art. Moreover, the identification herein of desirable courses of action reflects the inventors' own observations and ideas, and should not be assumed to indicate an art-recognized desirability.

SUMMARY

In an embodiment of the disclosed principles, a full bridge tunnel diode inverter is provided having a pair of input terminals and a first pair of tunnel diodes bridging the input terminals such that the tunnel diodes are in series and oriented the same. A second series pair of tunnel diodes bridges the input terminals as well. In an optional embodiment, a first pair of schottky diodes is connected in parallel and in an opposite orientation to one of the first pair of tunnel diodes and a second pair of schottky diodes is connected in parallel and in an opposite orientation to one of the second pair of tunnel diodes such that the first pair of schottky diodes and the first pair of tunnel diodes meet at a first intersection point and the second pair of schottky diodes the second pair of tunnel diodes meet at a second intersection point. These intersection points form a pair of outputs of the full bridge tunnel diode inverter for a primary transformer coil.

In another embodiment of the disclosed principles, an electrical power transformer is provided having a full bridge tunnel diode inverter, which itself includes a number of specific features. These include a pair of input terminals, a first series pair of tunnel diodes bridging the input terminals, a second series pair of tunnel diodes bridging the input terminals. A first pair of schottky diodes may be included in parallel but in an opposite orientation to respective ones of the first pair of tunnel diodes. In this embodiment, the first pair of schottky diodes and the first pair of tunnel diodes meet at a first intersection point. In this embodiment, a second pair of schottky diodes is included, in parallel but in an opposite orientation to respective ones of the second pair of tunnel diodes.

The second pair of schottky diodes and the second pair of tunnel diodes meet at a second intersection point, and the first intersection point and second intersection point form a pair of outputs. A primary transformer coil is connected across the first and second intersection points, and a secondary transformer coil is inductively coupled to the primary transformer coil.

In another embodiment, a method is provided for powering an electrical device from an AC electrical power source. The method includes filtering the AC power through a bridge rectifier to generate a rectified power signal and feeding the rectified power signal to an inverter circuit having at least four tunnel diodes to generate a modified AC power signal. The modified AC power signal is provided to a primary transformer coil, and power for the electrical device is received from a secondary transformer coil inductively coupled to the primary transformer coil.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
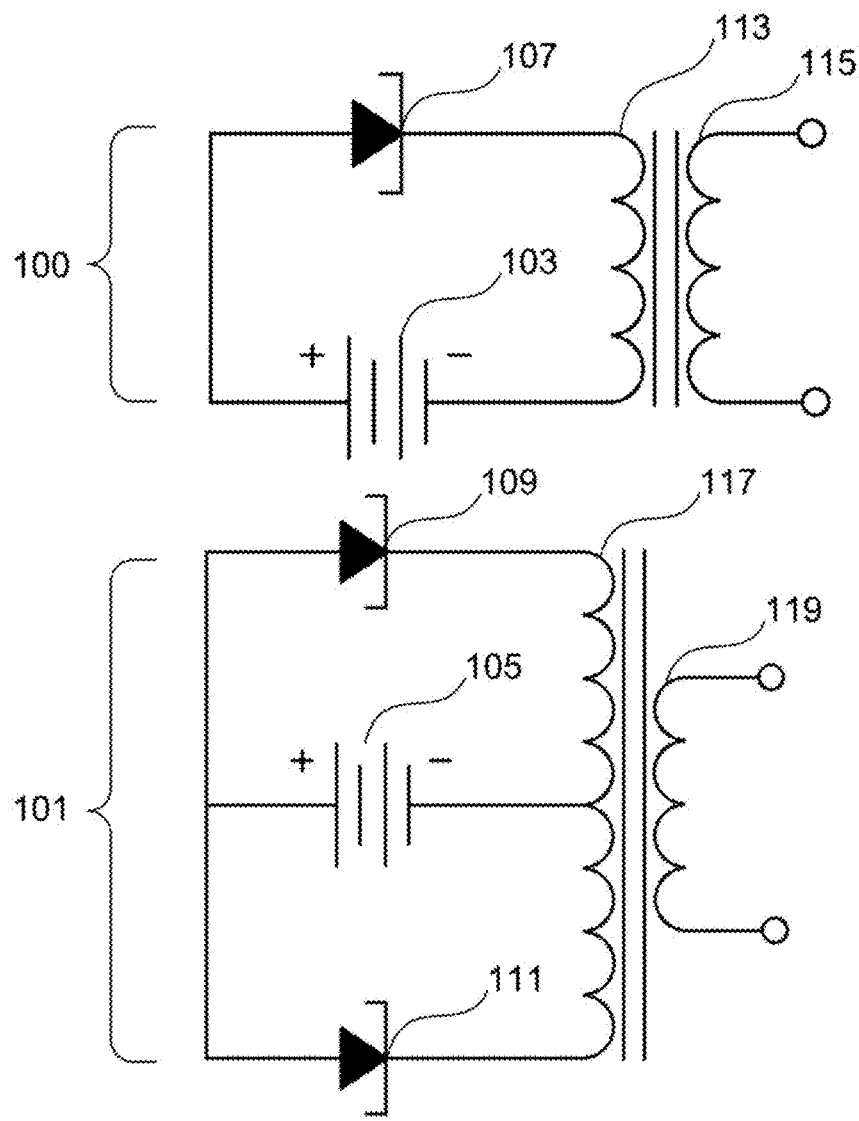
FIG. 1 is a circuit schematic view of a two typical half wave inverter transformer circuits.

As noted above, AC is such a convenient and prevalent electrical power form, and most household electrical appliances require AC power. This presents a challenge for power sources that produce DC power, e.g., photovoltaic solar panels, because in most cases DC power will fail to operate, and even damage, electrical appliances designed to use AC power. This necessitates an electrical appliance or device that converts DC to AC power, sometimes called a DC-to-AC converter, or more commonly called an inverter. These devices typically require magnetic components and complex switching electronics to provide comparable conversion efficiency and power quality to the AC power produced from an electrical transformer that is fed from the high voltage of an electrical grid. The A challenge of inverter design is to reduce the bulk contributed by the magnetic materials (this bulk decreases with increased switching frequency) and the heat sinking needed for the electronic switching devices (the required heat sink capacity increases with increased switching frequency). The use of tunnel-diode inverter circuits, with their fast switching speeds, can enable inverters with both compact magnetics and compact heat sinks Before presenting a detailed discussion of embodiments of the disclosed principles, an overview of certain embodiments is given to aid the reader in understanding the later discussion. It will be appreciated by those of skill in the art that a tunnel diode is an electrical component that uses electron tunneling to provide unique behavior.

As implied by the word "diode" in its name, the tunnel diode acts in a different manner under forward bias than it does under reverse bias. In particular, when the tunnel diode is forward biased, increasing voltage at first results in an increasing number of electrons tunneling through a mismatched bandgap at a junction barrier from a valence state on one side to a conduction state on the other. However, further increasing voltage begins to misalign electron states in the conduction band on the n-side of the junction with empty valence band hole states on the p-side. As these states become increasingly misaligned, current drops; thus, there is an operating regime wherein increased voltage results in decreased current. With yet further increases in forward voltage, electrons become able to flow by conduction across the junction rather than tunneling. In this range, the tunnel diode exhibits normal diode conduction behavior.

Turning to the reverse bias behavior of the tunnel diode, in this mode the filled p-side states become more, rather than less, aligned with the empty n-side states. This allows increased conduction with increased reverse bias, since the electrons can more easily tunnel through the junction.

Tunnel diodes were once considered to hold high potential for advancing electronics into new regimes of voltage, temperature, frequency, operational life and even radiation hardness for extreme applications. However, improvements in silicon devices have largely surpassed the potential once offered by the tunnel diode. Indeed, tunneling devices today are mainly used for generating microwave RF energy in radar guns and other low-power applications.

For energy harvesting, there are two mature tunnel-diode power conversion topologies—each incorporating a transformer—that are simple and robust, but that exhibit reduced efficiency at light loads. The operation of the transformer is different for each topology, but for both, operation is more complex than in the simple step up/down conversions of sinusoidal transformer currents. This leads to transformer construction that is larger and more costly than would be needed for simple step up/down transformer operation. These drawbacks are addressed by various topologies disclosed herein.

In an embodiment, a full-bridge tunnel diode inverter topology provides a balanced push-pull drive voltage and current across the entire transformer primary. Moreover, the full-bridge tunnel diode inverter in certain embodiments avoids operating its tunnel diodes in the high-current/high-voltage state at light loads, unlike a single-diode inverter. The disclosed principles also allow a full-bridge tunnel diode inverter topology that potentially avoids RF chirps in the tunnel diodes during rising or falling device ramp currents (that is, the primary current always passes through two tunnel diodes in series).

This may also prevent overload protection with a soft shut-down. More particularly, this need may arise when a shorted secondary prevents non-isolated transformer operation in the primary, preventing complimentary toggling of the tunnel diode totem poles, leading to shut down.

The described topology can be implemented with discrete tunnel diodes and miniature transformers in an embodiment. Moreover, silicon tunnel diodes may allow the integration of inductor and tunnel devices together on a single chip.

As noted above, the described topology addresses the fundamental inefficiencies of existing tunnel diode DC-to-AC converters by avoiding operation of the tunnel diode in the high-voltage/high-current state at light loads. This is accomplished through the switching action of the tunnel diodes, which diverts current from the tunnel diode into low-loss schottky snubbers. This causes the majority of the voltage drop from the DC input voltage to be applied across the primary winding of the transformer, reducing losses in power conversion. Furthermore, the application of DC across the full span of the primary winding and true differential operation allow the primary winding and the transformer to be more compact than is otherwise possible.

With this overview in mind, and turning now to a more detailed discussion in conjunction with the attached figures, FIG. 1 is a simplified circuit view of two simple tunnel diode transformer circuits 100, 101 for use as DC-to-AC converters. The illustrated circuits 100, 101 include respective DC power sources 103, 105. In addition, the first circuit 100 includes a tunnel diode 107, and the second circuit 101 includes two tunnel diodes 109, 111. The first circuit includes a primary coil 113 and a secondary coil 115. The second circuit 101 includes a center-tapped primary coil 117 and a secondary coil 119.

In operation, the oscillation of these circuits is self-starting due to the IV behavior of the tunnel diodes. In particular, tunnel diodes exhibit non-monotonic current vs voltage behavior, including a voltage regime in which the diode shows negative resistance (decreasing current with increasing voltage). In operation, when the tunnel diode enters a normal conduction region after passing through the negative resistance region, the current jumps causing the voltage to drop, placing the tunnel diode state back in a first normal conduction region prior to the negative resistance region.

The single-diode circuit 100 has the advantage of being self-starting and simple. However, as part of the circuit's operating cycle, the tunnel diode is driven into a high-current, high-voltage region of the I-V curve, causing power dissipation in the tunnel diode and wasting power that could be applied across the primary winding and thus delivered to the load. The two-diode circuit 101 prevents operating the tunnel diodes in the high-current, high-voltage region of the I-V curve (because of a complimentary clamping action), but the primary of the transformer has a center tap connected to the DC power supply, and the circuit can only deliver power into one half or the other of the primary winding due to that center tap.

As noted above, full bridge rectifier circuits using tunneling diodes also may exist. The full bridge tunnel-diode configuration addresses the inefficiency of the single tunnel diode configuration by keeping the tunnel diode out of the high-current, high-voltage portion of its I-V curve. The full bridge tunnel-diode inverter also addresses the wasted material in the transformer of the dual-tunnel-diode inverter (only half of the primary winding accepts input power, and the larger primary may require a bulkier magnetic core as well) by applying a full differential voltage across the entire primary winding at all times. The primary also has a center tap, but it is used to create a "fulcrum" in the middle of the primary, so that when one totem pole switches from the high state to the low state (for example), it immediately "nudges" the other totem pole to switch from the low to the high state.

Figure 2:
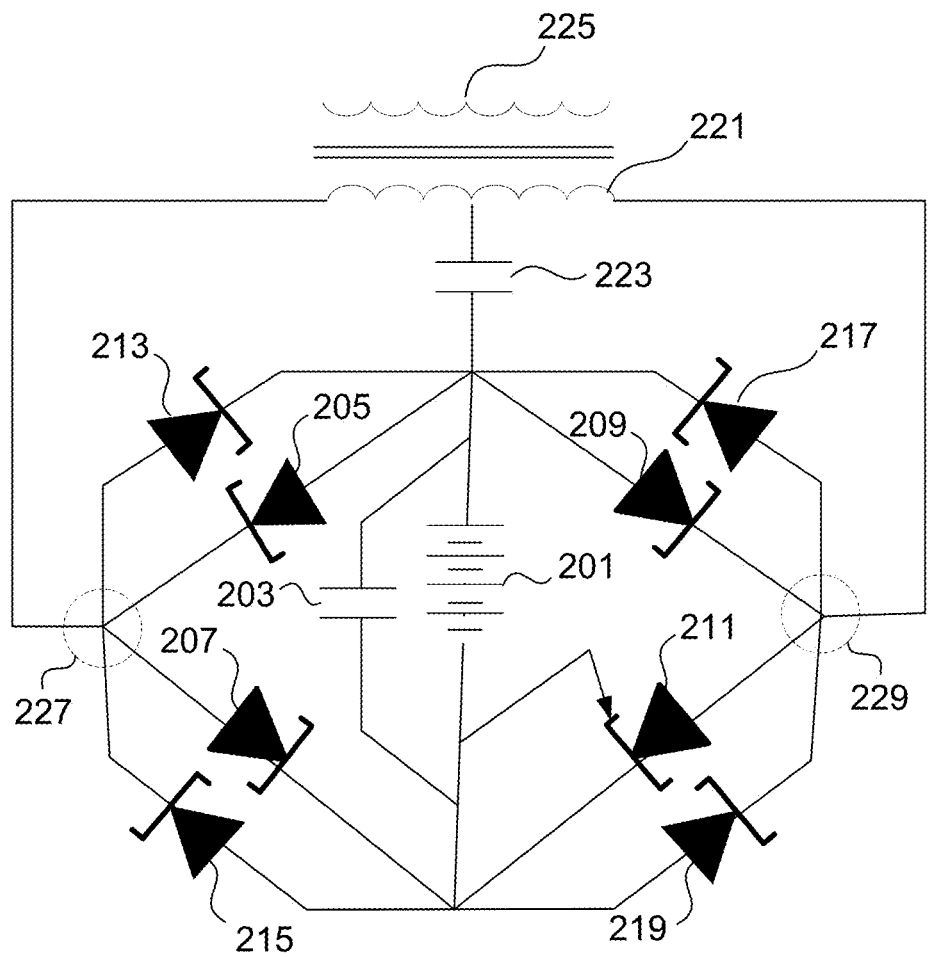
FIG. 2 is a circuit schematic view of a full bridge tunnel diode inverter with schottky clamps in accordance with an embodiment of the disclosed principles.

FIG. 2 is a circuit schematic view of a full bridge tunnel diode inverter with schottky clamps in accordance with an embodiment of the disclosed principles. In particular, as can be seen, the AC power source 201 is bridged by a capacitor 203, in addition to two series pairs of diodes. One diode pair includes two tunnel diodes 205, 207. The other diode pair also includes two tunnel diodes 209, 211, with the second tunnel diode 211 being biased via one terminal of the power source 201.

In addition, the power source 201 is bridged by two serial pairs of schottky diodes 213, 215 and 217, 219, with each schottky diode being reversed in polarity relative to its counterpart tunnel diode. It will be appreciated that the schottky diodes 213, 215, 217 and 219 are not essential and may be omitted in an alternative embodiment.

The center of each tunnel diode pair is tied to the center of the counterpart schottky diode pair, and these intersections feed the terminals of the primary transformer coil 221. In addition, a capacitor 223 joins a terminal of the power source 201 to the center tap of the primary transformer coil 221. As those of skill in the art will appreciate, the transformer 220 also includes a secondary coil 225.

Figure 3:
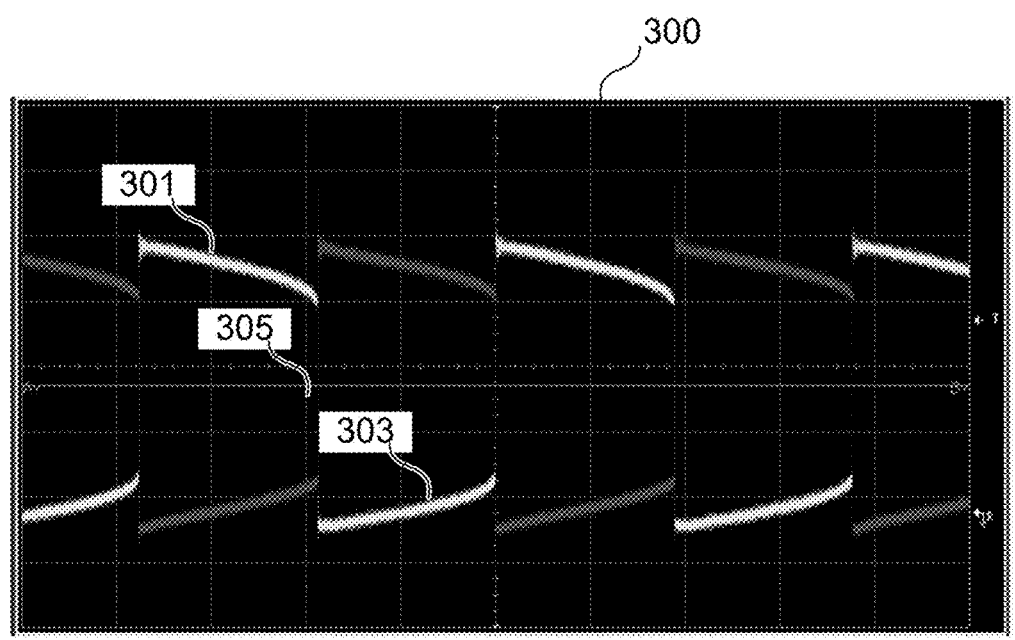
FIG. 3 is a no load data plot showing full bridge tunnel diode inverter output voltage waveforms using an embodiment of the disclosed principles.

FIG. 3 is data plot 300 showing full bridge tunnel diode inverter output voltage waveforms at no load, and measured at nodes (227 and 227), referenced to the negative side of battery (201) in the FIG. 2 circuit, resulting from the illustrated architecture. As can be seen, the circuit output goes between a positive state 301 and a negative state 303 and back, with a very fast transition 305 between states.

Figure 4:
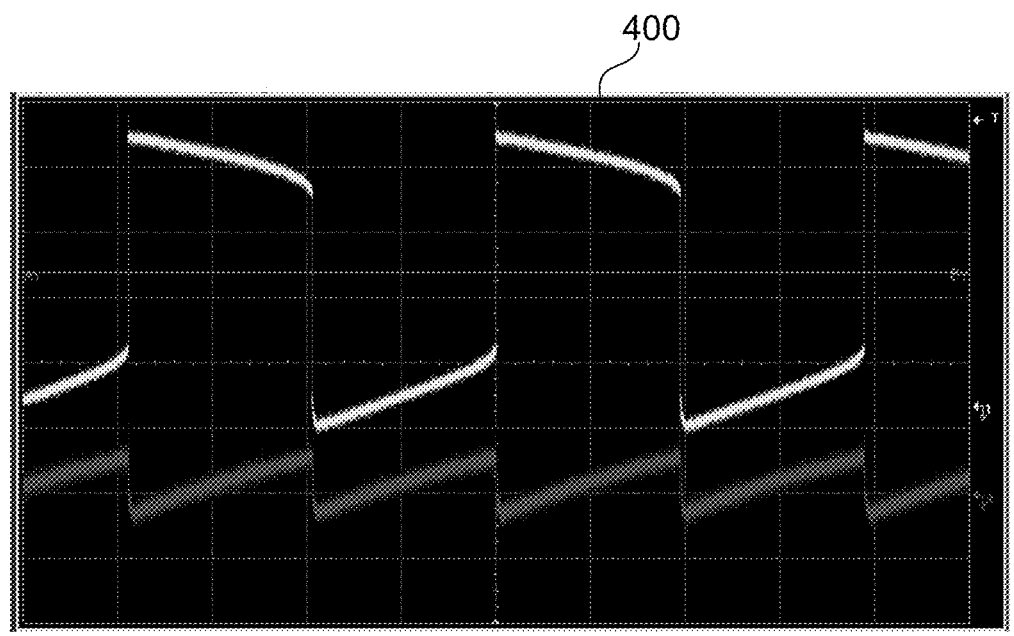
FIG. 4 is a data plot showing a full bridge tunnel diode inverter input current waveform under no load conditions in keeping with an embodiment of the disclosed principles.

FIG. 4 is a data plot 400 showing a full bridge tunnel diode inverter input current waveform under no load conditions in keeping with an embodiment. As can be seen, under no load conditions, the input current waveform exhibits the instability and rapid transitions discussed above. FIG. 4 also shows that the current through battery 201 in FIG. 2 circuit has a very small average value—exhibiting a "sawtooth" shape with a DC value slightly above zero—indicating low power consumption for the no-load condition.

The illustrated circuit is self-oscillating due to the unique voltage/current curve of the tunnel diodes 205, 207, 209, 211 and the self-inductance of primary winding 221. This instability is a result of at least small instantaneous differences in the voltages at intersection points 227, 229. However, it is possible for the circuit to stabilize and cease oscillating if, for some reason, both intersection points 227, 229 settle at very similar positive values or very similar negative values. For this reason, a small destabilizing circuit or element is helpful in an embodiment to ensure that the main circuit continues to oscillate. In an embodiment, the destabilizing circuit is a simple capacitor-based timing circuit that forces a change in the voltage of one intersection point 227 or the other 229 after a predetermined period of stability (predetermined via the capacitance and resistor values of the destabilizing circuit). The destabilizing circuit may pull up a low value or may pull down a high value, and in an embodiment both types may be used, one at each intersection point 227, 229.

Figure 5:
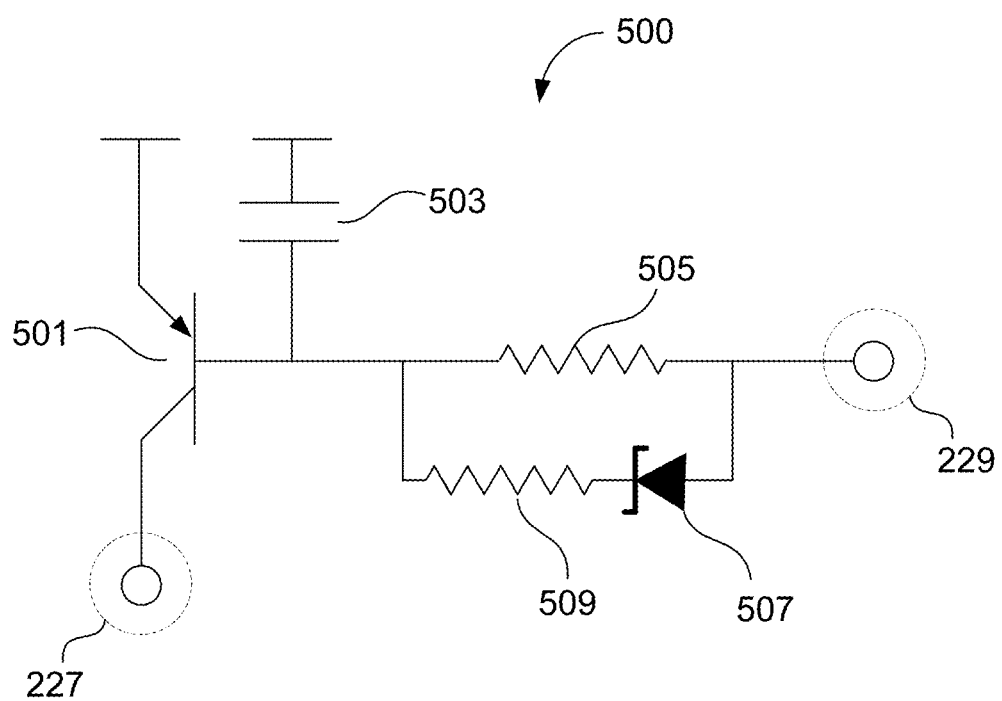
FIG. 5 is a circuit schematic view of a destabilizing circuit in keeping with an embodiment of the disclosed principles.

FIG. 5 is a circuit schematic view of a possible destabilizing circuit in keeping with an embodiment of the disclosed principles. As can be seen, the destabilizing circuit 500 detects a voltage at intersection point 229 in order to modify the voltage and intersection point 227 under certain conditions.

In particular, the circuit 500 includes a transistor 501 connected to pull the first intersection point 227 high if the transistor gate drops low. The transistor gate is tied high by a capacitor 503. The capacitor is charged and discharged by the second intersection point 229, through a first resistor 505 in parallel with a Schottky diode 507 and a second resistor 509. In operation, as long as the voltage at the second intersection point 229 oscillates more quickly than the effective time constant of the capacitor-resistor combination can significantly oscillate the transistor gate, the transistor remains powered off and the first intersection point 227 is free to oscillate as well. However, if the second intersection point 229 stabilizes at low voltage, the capacitor-resistor combination will charge the capacitor 503, dropping the transistor gate low. This will, in turn, power the transistor 501 and pull the first intersection point 227 high, restarting the oscillation of the intersection points 227, 229.

Figure 6:
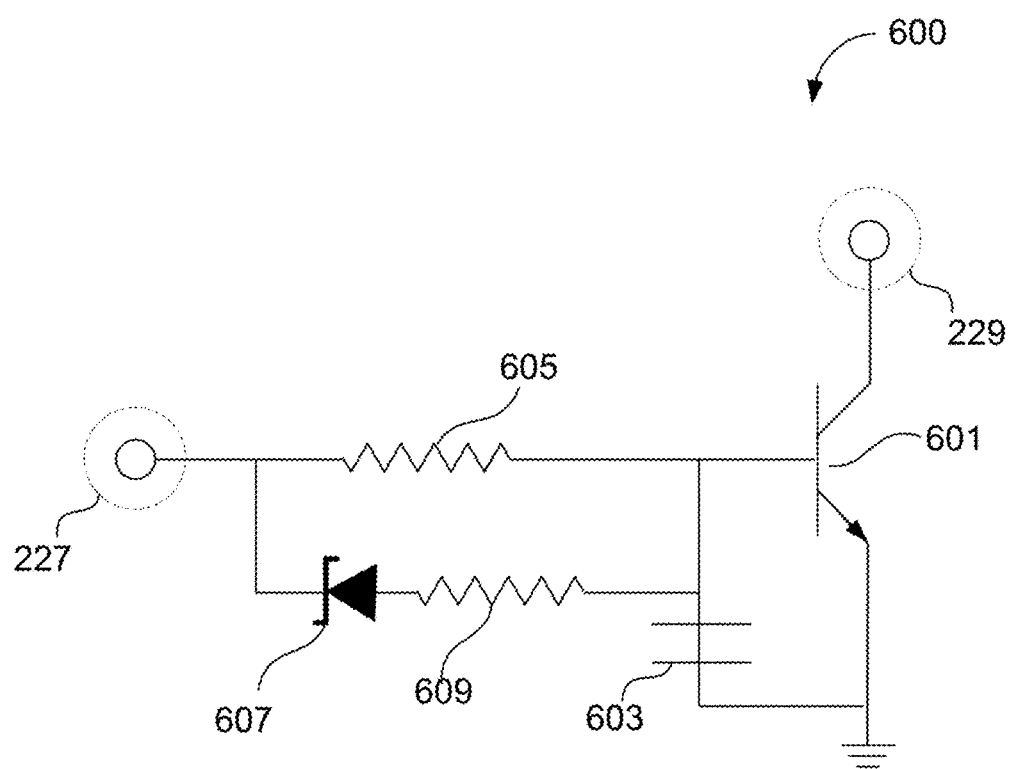
FIG. 6 is a circuit schematic view of a destabilizing circuit in keeping with an alternative embodiment of the disclosed principles.

FIG. 6 is a circuit schematic view of a destabilizing circuit in keeping with an alternative embodiment of the disclosed principles. In this embodiment, the destabilizing circuit 600 includes a transistor 601 connected to pull the second intersection point 229 low if the transistor gate goes high. The transistor gate is tied to ground by a capacitor 603. The capacitor 603 is charged and discharged by the first intersection point 227, through a first resistor 605 in parallel with a Schottky diode 607 and a second resistor 609.

In operation, as long as the voltage at the first intersection point 229 oscillates more quickly than the effective time constant of the capacitor-resistor combination can significantly oscillate the transistor gate, the transistor 601 remains powered off and the first intersection point 229 is free to oscillate as well. However, if the second intersection point 227 stabilizes at high voltage, the capacitor-resistor combination will charge the capacitor 603, raising the transistor gate high. This will, in turn, power the transistor 601 and pull the second intersection point 229 low, restarting the oscillation of the intersection points 227, 229.

Figure 7:
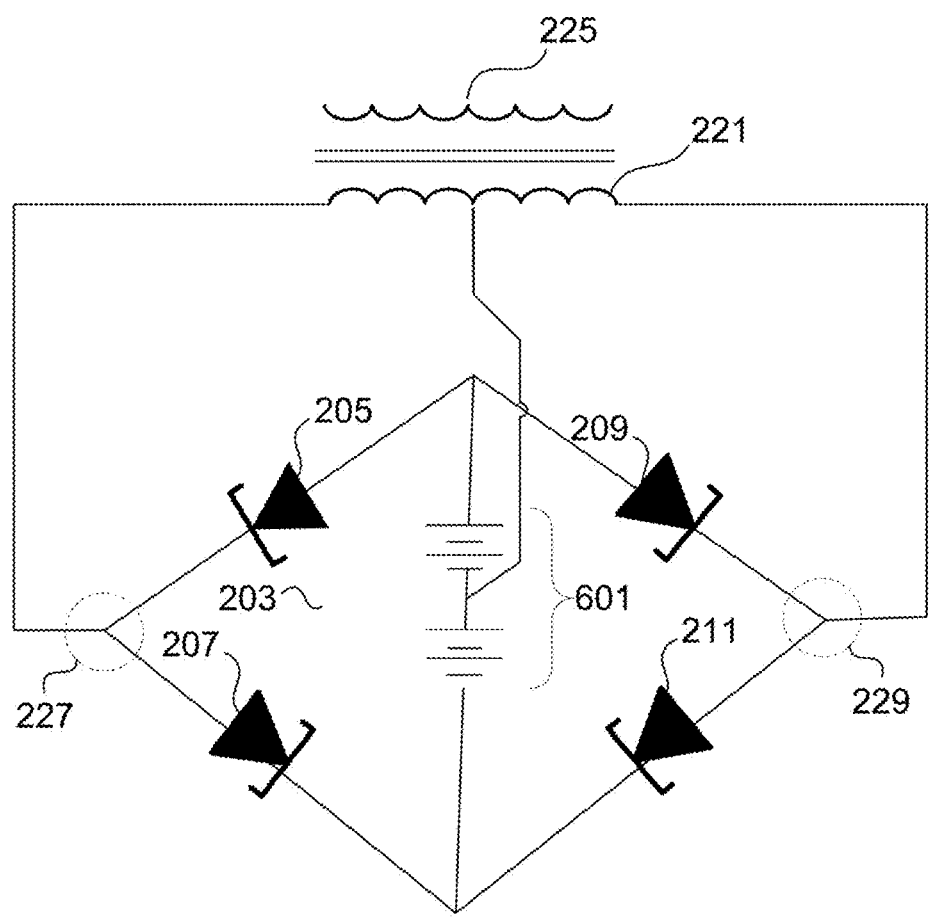
FIG. 7 is a schematic drawing of a self-starting circuit in keeping with an embodiment of the disclosed principles.

FIG. 7 is a schematic drawing of an alternative two-battery self-starting circuit in keeping with an embodiment of the disclosed principles. As can be seen, this circuit is similar to the original circuit of FIG. 2. However, instead of a single battery, a dual-battery series stack 601 is used, with a center tap between the batteries. This center tap is directly connected to the center tap of the transformer primary coil 221. As can be seen, this circuit is self-starting as well.

The efficiency of the illustrated full bridge inverter circuit with respect to energy, space and material allows the circuit to be useful for a great many applications. These include use in a miniaturized energy harvester for photovoltaic, thermoelectric, and other low-voltage/high-current DC sources.

In addition, the illustrated circuit can be used to convert power in other low power application such as in an ultra-low-power microwave RF (radio frequency) transmitter. The self-oscillating nature of the circuit also facilitates use as a high-frequency transistor gate driver and as a direct conversion FM modulator where the load determines the switching frequency.

As another example, the disclosed full bridge tunnel diode inverter with schottky clamps can be applied in a modular converter system. In such a system, the circuit input ports are connected in parallel, and circuit output ports are connected in series or parallel, and the illustrated circuit provides coupling that synchronizes switching operation among the modules.

In test implementations of embodiments of the disclosed principles, the tunnel diodes used were Gallium-Arsenide (GaAs), Part No. 31306J (USSR Military Grade) and the clamp diodes were Schottky barrier diodes, Part No. NSR0320MW2T1G, from ON Semiconductor.

While there are many other application scenarios for the illustrated circuit or similar circuits, this document will not attempt to catalog all such uses. Those of skill in the art will appreciate that there are many possible embodiments to which the principles of the present disclosure may be applied. The embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A full bridge tunnel diode inverter comprising:
   a pair of input terminals;
   a first pair of tunnel diodes bridging the input terminals, the first pair of tunnel diodes being connected in series and oriented in the same direction;
   a second pair of tunnel diodes bridging the input terminals, the second pair of tunnel diodes being connected in series and oriented in the same direction;
   a first pair of schottky diodes, each of the first pair of schottky diodes being connected in parallel and in an opposite orientation to a respective one of the first pair of tunnel diodes such that all of the first pair of schottky diodes and the first pair of tunnel diodes meet at a first intersection point; and
   a second pair of schottky diodes, each of the second pair of schottky diodes being connected in parallel and in an opposite orientation to a respective one of the second pair of tunnel diodes such that all of the second pair of schottky diodes and the second pair of tunnel diodes meet at a second intersection point, the first intersection point and second intersection point forming a pair of outputs of the full bridge tunnel diode inverter for a primary transformer coil.

2. The full bridge tunnel diode inverter in accordance with claim 1, further comprising a first capacitor bridging the pair of input terminals.

3. The full bridge tunnel diode inverter in accordance with claim 1, further comprising a second capacitor connected to one of the pair of input terminals, forming a center tap output for the primary transformer coil.

4. The full bridge tunnel diode inverter in accordance with claim 1, further comprising a destabilizing circuit to prevent stabilization of the full bridge tunnel diode inverter.

5. The full bridge tunnel diode inverter in accordance with claim 4, wherein the destabilizing circuit is attached to the first intersection point and pulls the first intersection point high if the first and second intersection points stabilize low.

6. The full bridge tunnel diode inverter in accordance with claim 4, wherein the destabilizing circuit is attached to the second intersection point and pulls the second intersection point low if the first and second intersection points stabilize high.

7. The full bridge tunnel diode inverter in accordance with claim 4, wherein the destabilizing circuit includes at least a transistor and a Schottky diode.

8. The full bridge tunnel diode inverter in accordance with claim 7, wherein the destabilizing circuit further includes at least one resistor connected in parallel with the Schottky diode.

9. The full bridge tunnel diode inverter in accordance with claim 8, wherein the destabilizing circuit further includes at least one resistor connected in series with the Schottky diode.

10. The full bridge tunnel diode inverter in accordance with claim 3, further including a dual battery power source having two batteries connected in series and having a midpoint there between, and further comprising a conductive link electrically connecting the midpoint to the center tap of the primary coil.

11. An electrical power transformer comprising:
    a full bridge tunnel diode inverter including:
    a pair of input terminals;
    a first pair of tunnel diodes bridging the input terminals, the first pair of tunnel diodes being connected in series and oriented in the same direction;
    a second pair of tunnel diodes bridging the input terminals, the second pair of tunnel diodes being connected in series and oriented in the same direction;
    a first pair of schottky diodes, each of the first pair of schottky diodes being connected in parallel and in an opposite orientation to a respective one of the first pair of tunnel diodes such that all of the first pair of schottky diodes and the first pair of tunnel diodes meet at a first intersection point; and
    a second pair of schottky diodes, each of the second pair of schottky diodes being connected in parallel and in an opposite orientation to a respective one of the second pair of tunnel diodes such that all of the second pair of schottky diodes and the second pair of tunnel diodes meet at a second intersection point, the first intersection point and second intersection point forming a pair of outputs;
    a primary transformer coil connected across the first and second intersection points; and
    a secondary transformer coil inductively coupled to the primary transformer coil.

12. The electrical power transformer in accordance with claim 11, further comprising a first capacitor bridging the pair of input terminals.

13. The electrical power transformer in accordance with claim 11, further comprising a second capacitor connected to one of the pair of input terminals, forming a center tap output for the primary transformer coil.

14. The electrical power transformer in accordance with claim 11, further comprising a destabilizing circuit to prevent stabilization of the first and second intersection points.

15. The electrical power transformer in accordance with claim 14, wherein the destabilizing circuit is attached to the first intersection point and pulls the first intersection point high if the first and second intersection points stabilize low.

16. The electrical power transformer in accordance with claim 14, wherein the destabilizing circuit is attached to the second intersection point and pulls the second intersection point low if the first and second intersection points stabilize high.

17. The electrical power transformer in accordance with claim 14, wherein the destabilizing circuit includes at least a transistor and a Schottky diode.

18. The electrical power transformer in accordance with claim 17, wherein the destabilizing circuit further includes at least one resistor connected in parallel with the Schottky diode.

19. The electrical power transformer in accordance with claim 18, wherein the destabilizing circuit further includes at least one resistor connected in series with the Schottky diode.

* * * * *